United States Patent Office 3,536,750
Patented Oct. 27, 1970

3,536,750
PRODUCTION OF METHYL-2-HYDROXY-
2-METHYLPROPIONATE
Jerry D. Holmes and Hugh J. Hagemeyer, Jr., Longview,
Tex., assignors to Eastman Kodak Company, Rochester, N.Y., a corporation of New Jersey
No Drawing. Filed Oct. 2, 1967, Ser. No. 671,941
Int. Cl. C07c *69/68*
U.S. Cl. 260—484  7 Claims

ABSTRACT OF THE DISCLOSURE

The use of hydrogen bromide as a catalyst in the production of methyl-2-hydroxy-2-methylpropionate (methyl alphahydroxyisobutyrate) by the oxidation of methyl isobutyrate obviates the need for high temperatures, large quantities of oxidizing acids, and minimizes undesirable by-product formation.

---

This invention is concerned with the process of preparing methyl-2-hydroxy-2-methylpropionate which finds utility as an intermediate in the production of methyl methacrylate. More specifically, this invention is concerned with the process of catalytically converting methylisobutyrate to methyl-2-hydroxy-2-methylpropionate.

Methyl-2-hydroxy-2-methylpropionate can be prepared by nitric acid oxidation of isobutylene (U.S. Pat. 2,847,465) to alpha-hydroxyisobutyric acid and then esterification with methanol. This process has the disadvantage of using and handling large quantities of nitric acid. In 1949 F. F. Rust and coworkers (Industrial and Engineering Chemistry, 41, 2597) reported good yields to t-butylhydroperoxide from the hydrogen bromide-catalyzed oxidation of isobutane. These workers oxidized several different hydrocarbons and halogenated hydrocarbons. They obtained varying amounts of hydroperoxides, dialkylperoxides, and alcohols. There are numerous reports on iodine-catalyzed and hydrogen iodide-catalyzed oxidative-dehydrogenation of methylisobutyrate to give methyl methacrylate, however, these oxidative-dehydrogenation reactions are carried out at temperatures considerably higher than those used by Rust and co-workers.

Objects therefore of the present invention are: to provide an improved process for obtaining methyl-2-hydroxy-2-methylpropionate wherein undesirable by-product formation is minimized; and to obviate the need for large quantities of nitric acid, or high temperatures in the production of this material.

These and other objects hereinafter appearing have been attained in accordance with the present invention through the discovery that when methylisobutyrate is treated with oxygen or an oxygen-containing gas under the proper conditions in the presence of hydrogen bromide, methyl-2-hydroxy-2-methylpropionate is formed as the major reaction product. Little or none of the alpha-hydroperoxide or the diperoxide of methylisobutyrate is formed.

The present process uses methylisobutyrate, oxygen or an oxygen-containing gas, and anhydrous hydrogen bromide as starting materials. All of these reagents are readily available. The reaction can be carried out at temperatures from 100 to 200° C., but best results are obtained at 150-170° C. Lower temperatures decrease the conversion to methyl-2-hydroxy - 2 - methylproprionate, and the higher temperatures give excessive by-product formation. The process may be carried out at atmospheric pressure, but the reaction can be run at higher or lower pressures. The reaction is run in the vapor state with a residence time of 1 to 5 minutes. A residence time of 3 to 3.5 minutes gives a good conversion rate of methylisobutyrate to methyl-2-hydroxy-2-methylpropionate.

The reactor can be any of several designs. A straight tube, a straight tube with baffling, or a coiled tube all work satisfactorily. The reactor can be made of any material resistant to hydrogen bromide attack and which does not contain a surface so passive that no reaction occurs. The process has been operated with pyrex and vycor glass reactors. Best results were obtained from a pyrex glass reactor which had initially been treated with an aqueous boric acid solution. Methylisobutyrate, oxygen, and anhydrous hydrogen bromide are fed simultaneously through a steam-heated preheater into the top of the reactor which is mounted vertically. The product is cooled with a glycol condenser and collected at the bottom of the reactor.

Conversion of methylisobutyrate to methyl-2-hydroxy-2-methylproprionate is dependent on the concentration of hydrogen bromide in the feed. Some of the hydrogen bromide is consumed by bromination of methylisobutyrate to give methyl bromoisobutyrate. A part of the hydrogen bromide goes to bromination of fragmentation products such as acetone and about 40–50 percent of it goes through the reaction as is. The consumed hydrogen bromide can be recovered from the brominated material by pyrolysis or by hydrogenation over a suitable catalyst. Oxidation of methylisobutyrate can be carried out over a wide range of hydrogen bromide concentrations. From 2 to 60 percent hydrogen bromide in the feed may be used. Best results are obtained with a hydrogen bromide concentration of 25–30 percent based on methylisobutyrate fed.

Hydrogen bromide is unique as a catalyst in the oxidation of methylisobutyrate to methyl-2-hydroxy-2-methylpropionate. Compounds which normally function as catalyst in high temperature oxidative-dehydrogenation reactions are not effective in the present process. Some examples of these materials are alkyl chlorides, bromides, and iodides and hydrogen chloride and hydrogen iodide. The carbon-halogen bond is generally stable under our reaction conditions, thus the alkyl halides do not afford active catalysts. When the reaction is carried out in the presence of hydrogen iodide essentially no methyl-2-hydroxy-2-methylproprionate is formed, and a copious amount of free iodine is observed in the reaction mixture. At the present conditions, hydrogen chloride does not appreciably dissociate into free radiacls, thus it is ineffective as a catalyst. When the oxidation is run without any catalyst only a trace amount of methyl-2-hydroxy-2-methylpropionate is formed which illustrates the unique effectiveness of the hydrogen bromide catalyst.

The oxygen concentration can be maintained at lower values than shown in examples, but higher concentrations are desirable in order to obtain a higher rate of methyl-2-hydroxy-2-methylpropionate production. The examples show the runs made with the moles of oxygen being just slightly less than the moles of methylisobutyrate.

EXAMPLE 1

A vertical pyrex reactor 3.5 feet long and 30 mm. in diameter containing indentures in the reactor wall for baffling was used in this run. The reactor was pretreated by rinsing with 5 percent boric acid solution and then evacuating at 150°/20 mm. Methylisobutyrate, oxygen, and hydrogen bromide were fed through a steam-heated coil preheater into the top of the reactor. A residence time of about 3 minutes and a temperature range of 160–175° C. were maintained during the run. Over a 3-hour period 58 ml. (0.51 mole) of methylisobutyrate, 11 grams (0.135 mole) of hydrogen bromide, and 13 grams (0.41 mole) of oxygen were fed through the reactor. A quantitative vapor-phase chromatographic analysis of the product mixture gave 12 grams of methyl-2-hydroxy-2-methylpropionate and 38 grams of unreacted methylisobutyrate. This corresponds to a 75 percent yield and 20 percent conversion.

EXAMPLE 2

The reactor in this run was the same as in Example 1 except it was made of vycor tubing and was not treated with boric acid. Over a 7-hour period at 140–160° C. 1.1 moles of methylisobutyrate, 0.58 mole of hydrogen bromide and 0.94 mole of oxygen were fed through the reactor. Vapor-phase chromatographic analysis of the product-mixture gave 0.49 mole of unreacted methylisobutyrate, 0.34 mole of methyl-2-hydroxy-2-methylpropionate, and 0.09 mole of methyl bromoisobutyrate. This corresponds to a 56 percent yield and 31 percent conversion to methyl-2-hydroxy-2-methylpropionate.

The reaction product was extracted with 150 ml. of water, and the water extract titrated with standard sodium hydroxide solution. The water was found to contain 0.25 mole of hydrogen bromide. This corresponds to a 43 percent recovery of the hydrogen bromide fed.

EXAMPLE 3

A coil reactor made of 25 mm. diameter Pyrex tubing was used in this run. The reactor was made up of 5 coils of about 3-inch inside diameter. Pretreatment of the reactor consisted of rinsing it with 5 percent aqueous boric acid and evacuating at 155° C.

The reactor was then mounted vertically and run in a manner similar to that described in Examples 1 and 2. A constant temperature oil bath at 155° C. was used to heat the reactor. During the run a residence time of 3 minutes was held while a total of 0.375 mole of methylisobutyrate, 0.54 mole of hydrogen bromide, and 0.27 mole of oxygen were fed through the reactor. The reaction mixture contained 0.25 mole of unreacted methylisobutyrate, 0.07 mole of methyl-2-hydroxy-2-methylpropionate, and 0.024 mole of methyl bromoisobutyrate. This corresponds to a 56 percent yield and 18.5 percent conversion to methyl-2-hydroxy-2-methylpropionate.

EXAMPLE 4

This run was carried out essentially the same as described in Example 3 except the temperature was increased to 168.5° C. and no hydrogen bromide was fed. Methylisobutyrate (0.074 mole) and oxygen (0.068 mole) were fed together through the reactor. Only a trace of methyl-2-hydroxy-2-methylpropionate was detected in the reaction mixture. The reaction mixture was essentially all unreacted methylisobutyrate (0.073 mole). This example illustrates the uniqueness of the hydrogen bromide catalyst.

The invention has been described in detail with particular reference to preferred embodiments thereof, but it will be understood that variations and modifications can be effected within the spirit and scope of the invention as described hereinabove and as defined in the appended claims.

We claim:

1. A process for the production of methyl-2-hydroxy-2-methylpropionate comprising reacting oxygen or an oxygen-containing gas with methylisobutyrate in the presence of hydrogen bromide.

2. The process according to claim 1 in which the reaction is carried out in the vapor phase at between about 100 and 200° C.

3. The process according to claim 2 in which the residence time of the reactants in the reaction zone is 1 to 5 minutes.

4. The process according to claim 3 in which the hydrogen bromide concentration in the feed mixture is between about 2 and 60 weight percent based on methylisobutyrate fed.

5. The process according to claim 4 in which the process is carried out at about atmospheric pressure.

6. The process according to claim 5 in which the oxygen concentartion is maintained between about 20 and 100 mole percent of the methylisobutyrate fed.

7. The process according to claim 1 in which the reaction is carried out in a Pyrex glass-lined reactor which has been pretreated with boric acid.

References Cited

UNITED STATES PATENTS 2,434,888   1/1948   Rust et al. _____ 260—533 X

LORRAINE A. WEINBERGER, Primary Examiner

P. J. KILLOS, Assistant Examiner